United States Patent [19]
McCurry

[11] Patent Number: 5,191,968
[45] Date of Patent: Mar. 9, 1993

[54] SHAFT LOCK ARRANGEMENT FOR A POWER TOOL

[75] Inventor: Ronald C. McCurry, West Union, S.C.

[73] Assignee: Ryobi Motor Products Corp., Easley, S.C.

[21] Appl. No.: 764,239

[22] Filed: Sep. 23, 1991

[51] Int. Cl.⁵ .................... H01H 9/28; B27C 5/00
[52] U.S. Cl. .................... 200/43.11; 200/43.13; 200/43.16; 200/43.19; 200/322; 200/334; 409/182; 144/134 D; 144/136 G; 279/150; 408/710
[58] Field of Search .............. 200/43.01, 43.11, 43.16, 200/43.17, 43.19, 505, 318, 318.1, 318.2, 321, 322, 333, 332.2, 43.13, 334; 70/184, 185, 186; 409/182; 144/134 D, 136 C; 279/150; 408/710

[56] References Cited

U.S. PATENT DOCUMENTS

| | | |
|---|---|---|
| 2,702,098 | 2/1955 | Staak. |
| 2,897,302 | 7/1959 | Godfrey et al. |
| 3,487,747 | 1/1970 | Burrows et al. ............. 409/182 |
| 3,587,387 | 6/1971 | Burrows ..................... 409/182 |
| 3,612,787 | 10/1971 | Hlavsa ....................... 200/43.01 |
| 4,244,406 | 1/1981 | Stielper ..................... 200/334 X |
| 4,386,879 | 6/1983 | Martinmaas ............... 279/150 X |

Primary Examiner—Allan N. Shoap
Assistant Examiner—Paul A. Schwarz
Attorney, Agent, or Firm—Brooks & Kushman

[57] ABSTRACT

A router including an arrangement for locking the shaft against rotation and preventing power from being supplied to the motor when the shaft is locked. The shaft is locked by movement of a lock bar which traps a flatted portion of the shaft in an appropriately dimensioned slot. A secondary switch in the power path to the motor is controlled by movement of the lock bar. In addition, an indicator lamp connected to the secondary switch is lit when the shaft is locked and the router is still connected to a source of power.

6 Claims, 3 Drawing Sheets

SHAFT LOCK ARRANGEMENT FOR A POWER TOOL

BACKGROUND OF THE INVENTION

This invention relates to power tools having a rotating shaft and, more particularly, to a shaft lock arrangement for such a tool.

In a power tool such as a router, an internal motor has a rotating shaft coupled to receive a cutting tool at an exposed end. Cutting tools of varying characteristics are selectively installed on, or removed from, the shaft, depending upon the job being performed by the operator of the router. For installation and removal of a cutting tool, the shaft must be locked against rotation. If power is supplied to the motor while the shaft is locked, this can result in damage to the motor. It is therefore an object of the present invention to provide an arrangement for locking the shaft of a power tool and automatically preventing power from being supplied to the motor when the shaft is locked.

If the power tool is connected to a source of power by means of a line cord when the shaft is locked for installation, removal or replacement of a cutting tool, it is possible that even with a power cut-off arrangement as described above, when the shaft is unlocked, power could be supplied to the motor, thereby resulting in unintended rotation of the shaft. It is therefore desirable that the operator disconnect the power tool from the power source when the shaft is to be locked. Accordingly, it is a further object of this invention to provide an arrangement which indicates to the operator that the power tool is connected to a source of power when the shaft is locked.

SUMMARY OF THE INVENTION

The foregoing, and additional, objects are attained in accordance with the principles of this invention by providing a shaft lock arrangement for a power tool, the power tool including a housing, a motor mounted in the housing, the motor having a shaft, and a main switch mounted in the housing and controllable for selectively applying power to the motor for rotating the shaft, the arrangement comprising a flatted portion of the shaft, a secondary switch in series with the main switch, the secondary switch having a first contact and an actuator arranged for movement toward and away from the first contact to close and open, respectively, the secondary switch, the actuator being yieldably biased to maintain the secondary switch in its open state, a lock bar mounted for movement in the housing between first and second positions, the lock bar being formed with an open slot so dimensioned to prevent rotation of the shaft when the flatted portion of the shaft is within the slot, the flatted portion of the shaft being within the slot when the lock bar is in its first (locked) position and outside the slot when the lock bar is in its second (unlocked) position, and an actuator arm mounted on the lock bar and arranged so as to engage the secondary switch actuator and place the secondary switch in its closed state when the lock bar is in its second (unlocked) position with the flatted portion of the shaft outside the slot and free to rotate, the actuator arm of the lock bar releasing the secondary switch actuator when the lock bar is moved from its second (unlocked) position toward its first (locked) position to allow the secondary switch to assume its open state.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
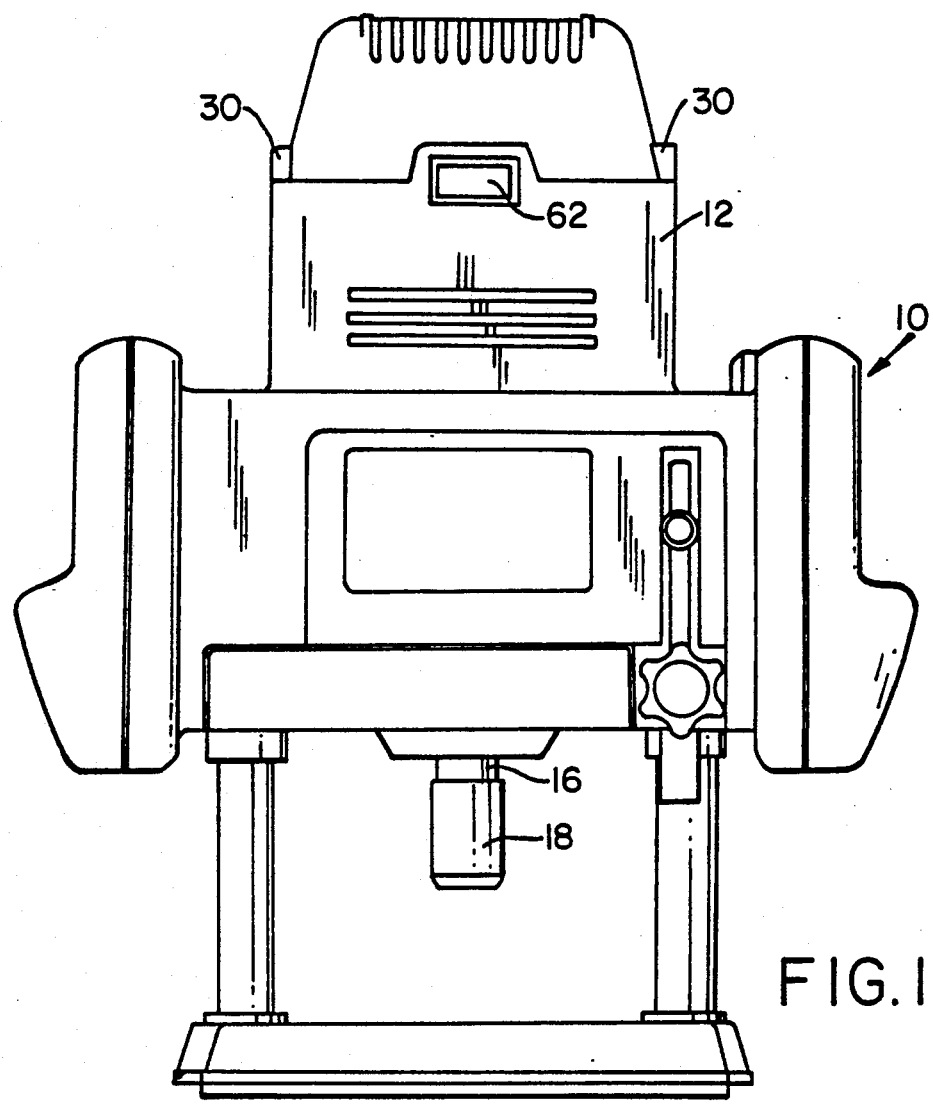
FIG. 1 is an elevational view of a router incorporating an arrangement according to this invention.

Referring now to the drawings, FIG. 1 illustrates a router, designated generally by the reference numeral 10, in which an arrangement according to this invention is incorporated. Thus, the router 10 includes a main housing 12 in which there is mounted a motor 14 (FIG. 5) in a conventional manner. The motor 14 includes a rotating shaft 16 which extends at its lower end out of the housing 12. The shaft 16 has mounted on its lower end a collet 18 to which the operator may attach a suitable cutting tool in a conventional manner. The router 10 also includes a main power switch 20 (FIG. 5) by means of which the operator may selectively apply power to the motor 14 so as to rotate the shaft 16 at a high speed to effect a cutting operation.

In order to change the cutting tool installed on the collet 18, it is necessary to mechanically lock the shaft 16 against rotation and to prevent power from being applied to the motor 14. To accommodate the former function, the shaft 16 at its upper end is formed with a flatted portion 22. To perform the latter function, there is provided a secondary switch 24 which is arranged in series with the main power switch 20, the motor 14, and the line cord 26, the line cord 26 being plugged into an outlet connected to a source of commercially available AC power, as is conventional. The switch 24 is arranged to maintain open the series connection to the main power switch 20, and only closes the connection when there is a definite freeing of the shaft 16 for rotation, as will be described hereinafter.

In accordance with this invention, there is provided a lock bar 28 which may be operated both to lock the shaft 16 from rotating and to control the switch 24. Thus, the lock bar 26 is held for reciprocating movement within the housing 12 by suitable guideways formed in interior ribbing of the housing 12. At either end, the lock bar 28 has mounted thereon, illustratively in a press-fit manner, actuator knobs 30. The lock bar 28 is formed with a slot 32 which is so dimensioned that it is larger than the width of the flatted portion 22 of the shaft 16 but smaller than the rounded diameter of the shaft 16. Accordingly, as is clear from FIG. 3, if the lock bar 28 is moved toward the right, as viewed in FIG. 3, the flatted portion 22 of the shaft 16 will go into the slot 32 so as to prevent the shaft 16 from rotating. As is further clear from FIG. 3, the right side of the slot 32 is open to a region of sufficient dimension that when the shaft 16 is in that region, due to the lock bar 28 being moved toward the left, the shaft 16 is free to rotate.

In order that the lock bar 28 may be moved between its first position where the flatted portion 22 of the shaft 16 is within the slot 32 and its second position where the flatted portion 22 is outside the slot 32 so the shaft 16 is free to rotate, and be maintained in the position to which it has been moved, the lock bar 32 is formed with a pair of recesses 34 and 36. Also, the housing 12 is formed with a counterbore 38 adjacent the lock bar 28. Within the counterbore 38 is a compression spring 40 and a ball 42, with the ball 42 being placed in the counterbore 38 after the spring 40. Thus, the recesses 34, 36, along with the ball 42 and the spring 40 form a spring loaded detent arrangement. The recesses 34, 36 are so situated that the recess 34 is opposite the counterbore 38 when the lock bar 28 is in its first position (i.e., the locked position) and the recess 36 is opposite the counterbore 38 when the lock bar 28 is in its second position (i.e., the unlocked position).

Figure 3:
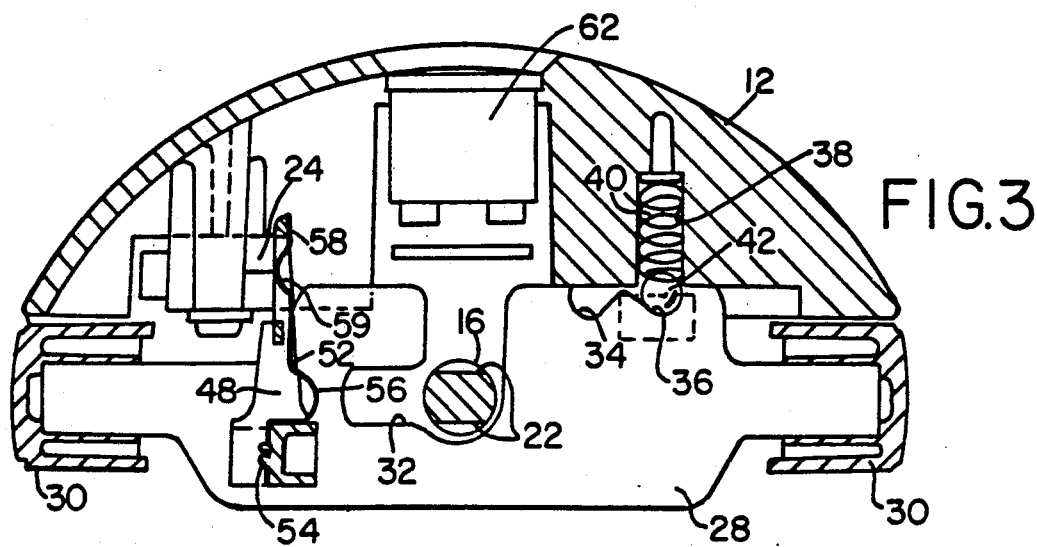
FIG. 3 is a cross sectional view taken along the line 3—3 in FIG. 2.
Figure 2:
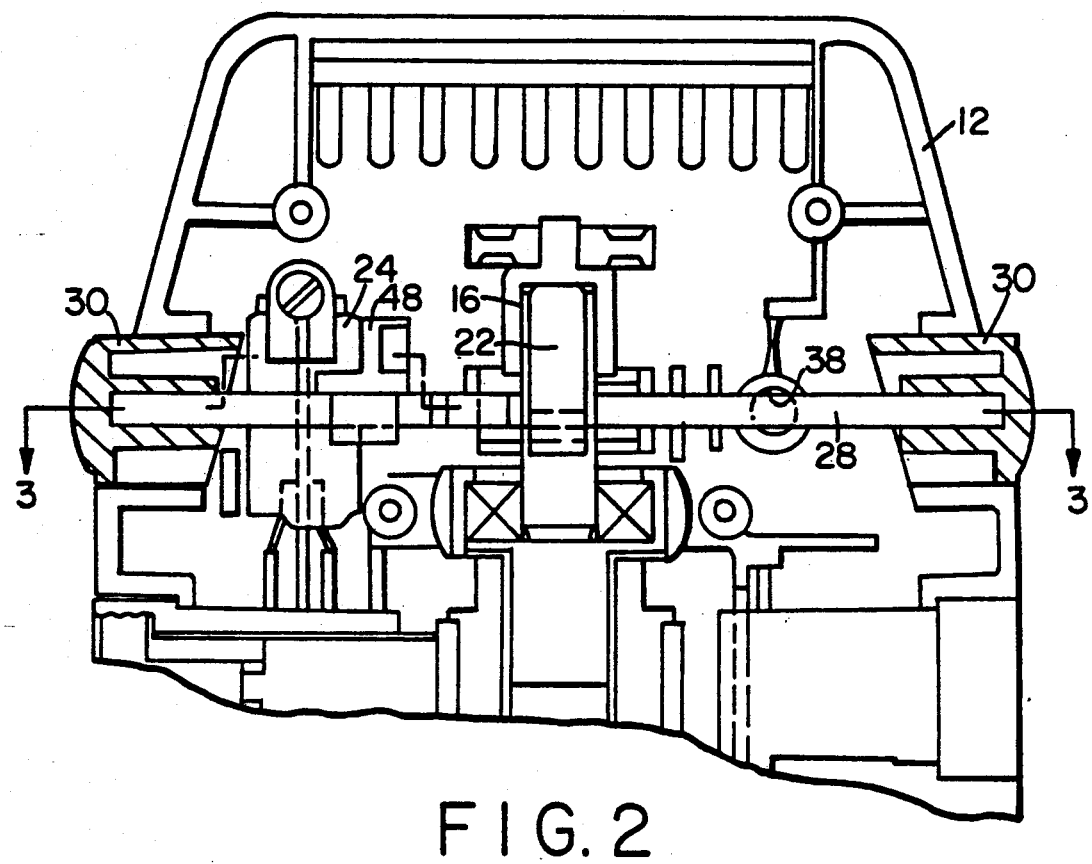
FIG. 2 is a cross sectional view of the upper housing portion of the router of FIG. 1 showing the arrangement according to this invention.
Figure 5:
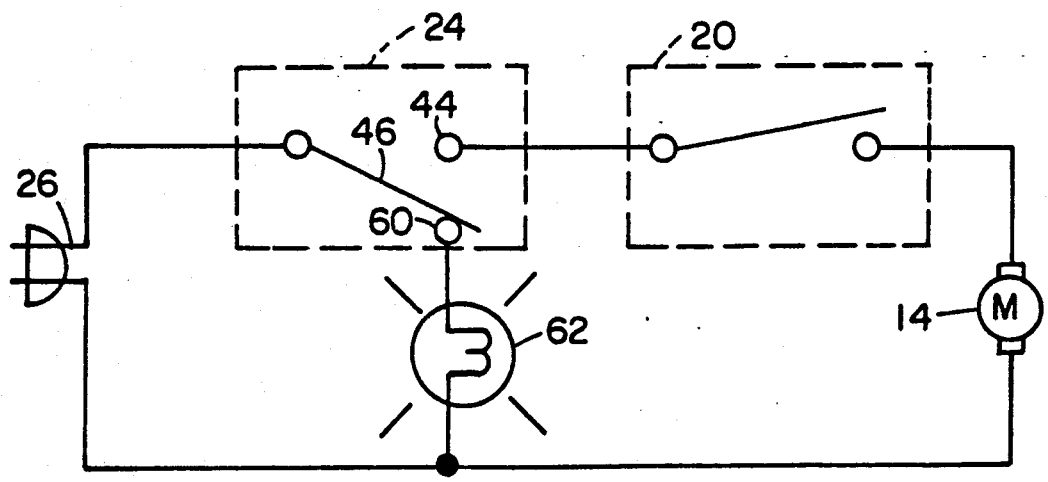
FIG. 5 is an electrical schematic diagram of circuitry constructed in accordance with the principles of this invention.
Figure 4:
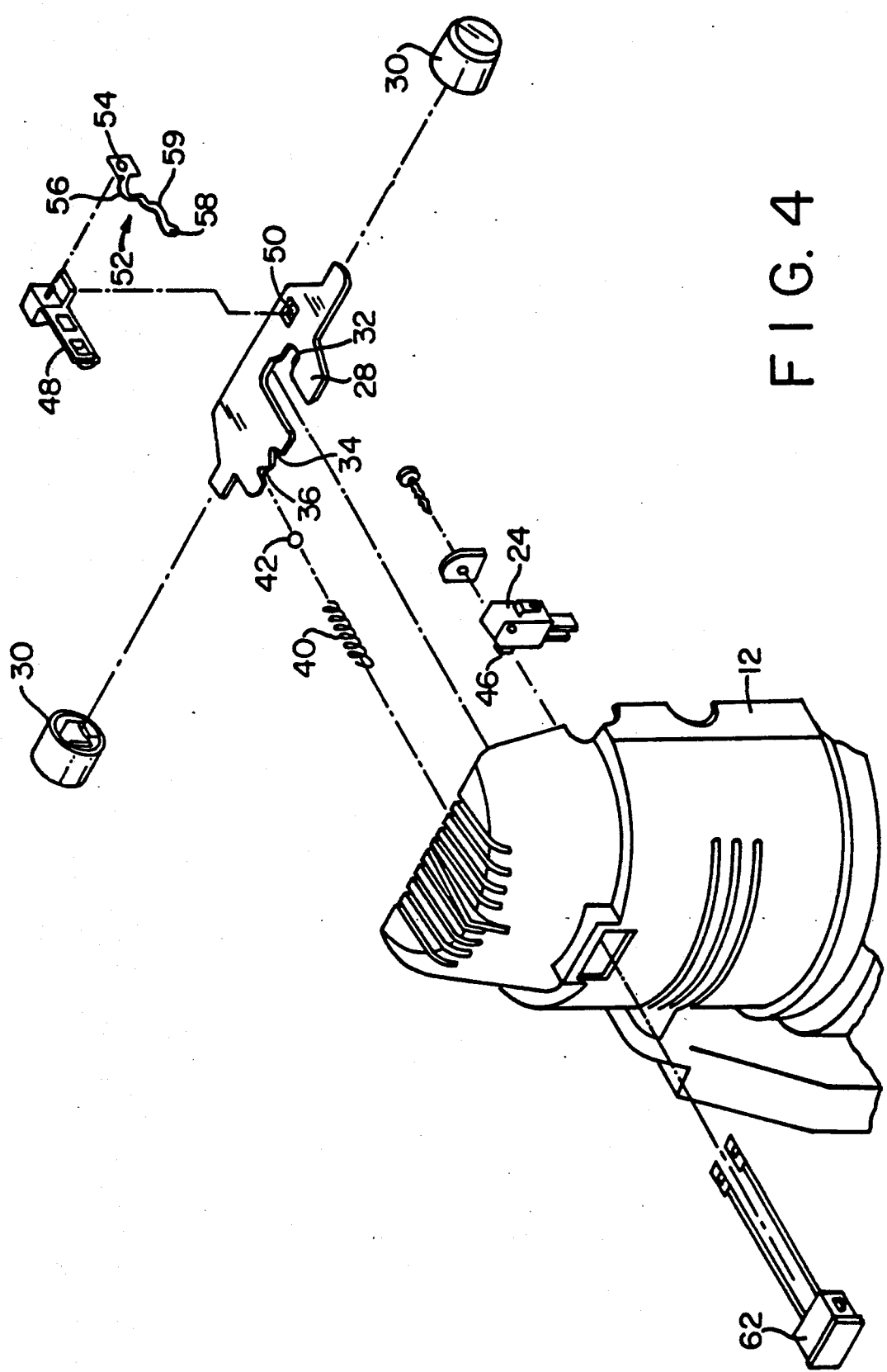
FIG. 4 is an exploded view showing pertinent portions of the inventive arrangement.

In order to prevent power from being applied to the motor 14 when the lock bar 28 has locked the shaft 16 from rotating, a secondary switch 24 is provided. The secondary switch 24 includes a first contact 44 and a movable actuator 46 (FIG. 5). The movable actuator 46 is yieldably biased away from the first contact 44 so that the power path to the motor 14 is normally open, as shown in FIG. 5. To close that power path, there is provided an actuator arm 48 which is mounted on the lock bar 28, illustratively by being snapped into an opening 50 in the lock bar 28. Mounted on the actuator arm 48 is a leaf spring 52 which is heat staked at one end 54 (FIG. 3). The leaf spring 52 is formed with a large bend 56 which acts to produce a counterclockwise force on the end 58 of the leaf spring 52, when viewed as in FIG. 3. The leaf spring 52 is further formed with a smaller bend 59 which extends away from the actuator arm 48 toward the secondary switch 24. The actuator arm 48 and the leaf spring 52 are situated on the lock bar 28 so that when the lock bar 28 is in its second position (i.e., the unlocked position), the bend 59 of the leaf spring 52 bears against the portion of the movable actuator 46 of the switch 24 which extends outwardly of the housing of the switch 24 so as to overcome the bias of the movable actuator 46 and move it into contact with the first contact 44. This results in closure of the power path to the motor 14. The reason for utilizing the leaf spring 52 to contact the movable actuator 46 rather than the rigid actuator arm 48 is that the leaf spring 52 can take up any dimensional tolerances which may exist within the router 10. Thereafter, when the lock bar 28 is moved to its first position (i.e., the locked position), the actuator arm 48 is moved away from the movable actuator 46 to allow the bias on the movable actuator 46 to move it away from the first contact 44. Further, the actuator arm 48 is so situated on the lock bar 28 that when the lock bar 28 is moved from its second position (i.e., the unlocked position) toward its first position (i.e., the locked position), the movable actuator 46 is released to move away from the first contact 44 prior to the flatted portion 22 of the shaft 16 entering the slot 32, so that the power path to the motor 14 is opened before the shaft 16 is locked.

On occasion, the operator will leave the router 10 plugged into the AC supply when changing a cutting tool. In order to provide an indication to the operator that power is connected to the router 10 while the shaft 16 is locked by the lock bar 28, the secondary switch 24 is provided with a second contact 60 whose condition relative to the movable actuator 46 is complemental to that of the first contact 44. In other words, the movable actuator 46 is in contact with either the first contact 44 or the second contact 60 at all times (except of course for the short interval when moving between its two positions). Further, an indicator lamp 62 is provided in circuit with the second contact 60, as illustrated in FIG. 5, so that when the power path to the motor 14 is open and the line cord 26 is connected to AC power, the indicator lamp 62 is energized.

Accordingly, there has been disclosed an improved shaft lock arrangement for a power tool. While a preferred embodiment of the present invention has been disclosed herein, it is understood that various modifications and adaptations to the disclosed arrangement will be apparent to those of ordinary skill in the art and it is only intended that this invention be limited by the scope of the appended claims.

I claim:

1. A shaft lock arrangement for a power tool, the power tool including a housing, a motor mounted in said housing, said motor having a shaft, and a main switch mounted in said housing and controllable for selectively applying power to the motor for rotating said shaft, said arrangement comprising:

a flatted portion of said shaft;

a secondary switch in series with said main switch, said secondary switch having a first contact and an actuator arranged for movement toward and away from said first contact to close and open, respectively, said secondary switch, said actuator being yieldably biased to maintain said secondary switch in its open state;

a lock bar mounted for movement in said housing between first and second positions, said lock bar being formed with an open slot so dimensioned to prevent rotation of said shaft when the flatted portion of said shaft is within said slot, said flatted portion of said shaft being within said slot when said lock bar is in said first position and outside said slot when said lock bar is in said second position; and an actuator arm mounted on said lock bar and arranged so as to engage said secondary switch actuator and place said secondary switch in its closed state when said lock bar is in its second position with said flatted portion of said shaft outside said slot and free to rotate, said actuator arm releasing said secondary switch actuator when said lock bar is moved from said second position toward said first position to allow said secondary switch to assume its open state.

2. The arrangement according to claim 1 wherein said secondary switch has a second contact whose condition relative said actuator is complemental to that of said first contact, the arrangement further including:

indicating means coupled to said secondary switch second contact for providing an indication that said shaft flatted portion is within said lock bar slot and said power tool is coupled to a source of power.

3. The arrangement according to claim 1 wherein said actuator arm is so situated on said lock bar that said secondary switch assumes its open state prior to said shaft flatted portion entering said lock bar slot as said lock bar is moved from said second position toward said first position.

4. The arrangement according to claim 1 further including means for maintaining said lock bar in whichever of said first or second positions it is placed.

5. The arrangement according to claim 4 wherein said maintaining means includes:
   a counterbore in said housing adjacent said lock bar;
   a compression spring in said counterbore;
   a ball resting on said spring; and
   a pair of recesses in said lock bar, a first of said recesses being adjacent said counterbore when said lock bar is in said first position and the other of said recesses being adjacent said counterbore when said lock bar is in said second position;
   whereby said ball and spring cooperate with said recesses to provide a spring loaded detent arrangement for said lock bar.

6. The arrangement according to claim 1 further including a leaf spring mounted on said actuator arm, said leaf spring being formed with a bend which extends away from said actuator arm toward said secondary switch actuator to contact said secondary switch actuator and compensate for dimensional tolerances.

* * * * *